US012759695B2

(12) United States Patent
Baruzzi et al.

(10) Patent No.: US 12,759,695 B2
(45) Date of Patent: Oct. 13, 2026

(54) SYSTEM AND METHOD FOR INTEGRATED AIRCRAFT COMMAND

(71) Applicant: EVE UAM, LLC, Wilmington, DE (US)

(72) Inventors: Filipe Andrade Baruzzi, Sao Jose dos Campos-SP (BR); Rafael Desideri De Freitas, Sao Jose dos Campos-SP (BR); Wilhelm Vatanabe Andriessen, Sao Jose dos Campos-SP (BR); Rodrigo Guidoni Gonzales, Sao Jose dos Campos-SP (BR); Yasser Mahmud Abdallah, Sao Jose dos Campos-SP (BR); Clesio Antonio Pontim, Sao Jose dos Campos-SP (BR)

(73) Assignee: EVE UAM, LLC, Wilmington, DE (US)

( * ) Notice: Subject to any disclaimer, the term of this patent is extended or adjusted under 35 U.S.C. 154(b) by 0 days.

(21) Appl. No.: 18/796,789

(22) Filed: Aug. 7, 2024

(65) Prior Publication Data

US 2025/0058869 A1 Feb. 20, 2025

Related U.S. Application Data

(60) Provisional application No. 63/519,661, filed on Aug. 15, 2023.

(51) Int. Cl.
*B64C 13/00* (2006.01)
*B64C 13/04* (2006.01)
*B64C 29/00* (2006.01)

(52) U.S. Cl.
CPC ...... *B64C 13/0421* (2018.01); *B64C 29/0025* (2013.01)

(58) Field of Classification Search
CPC . B64C 13/0421; B64C 29/0025; B64C 13/04; B64C 13/503; B64C 29/00; G05D 1/46; G05D 1/611
See application file for complete search history.

(56) References Cited

U.S. PATENT DOCUMENTS

| | | | | |
|---|---|---|---|---|
| 10,983,534 | B2 | 4/2021 | English et al. | |
| D974,276 | S * | 1/2023 | Kooiman | D12/345 |
| D974,277 | S * | 1/2023 | Rinehart | D12/345 |
| 11,667,375 | B2 * | 6/2023 | De Freitas | B64C 13/0421 244/12.4 |

(Continued)

FOREIGN PATENT DOCUMENTS

| | | | |
|---|---|---|---|
| JP | 7275272 | B2 | 5/2023 |
| WO | 2022175118 | A1 | 8/2022 |
| WO | 2024097634 | A1 | 5/2024 |

OTHER PUBLICATIONS

Extended European Search Report issued in EP Application No. 24194604.5 dated Dec. 20, 2024.

*Primary Examiner* — Ian Jen
(74) *Attorney, Agent, or Firm* — Nixon & Vanderhye P.C.

(57) ABSTRACT

An Integrated Aircraft Command (IAC) unifies a VTOL pilot's controls in a single controller or inceptor device to make it possible for the vehicle to be operated in all phases of flight and on the ground using only one component for the pilot's manual control. This results in a cockpit controls solution with less weight and reduced installation footprint compared to traditional systems present in the industry for different categories of aircraft.

21 Claims, 11 Drawing Sheets

(PRIOR ART)
Example cockpit control devices currently found in aviation industry

(56) References Cited

U.S. PATENT DOCUMENTS

| | | | | |
|---|---|---|---|---|
| 11,673,649 | B2 * | 6/2023 | English | B64C 13/0421 244/223 |
| 11,691,722 | B2 * | 7/2023 | Fink | B64C 27/08 244/7 A |
| 11,702,191 | B1 * | 7/2023 | Depenbusch | B64C 13/0421 701/3 |
| 11,815,911 | B2 * | 11/2023 | Thrun | B64C 27/08 |
| 11,940,816 | B2 * | 3/2024 | English | B64C 13/04 |
| 12,145,724 | B2 * | 11/2024 | Auerbach | B64C 29/0025 |
| 2017/0036753 | A1 * | 2/2017 | Shue | B64C 13/22 |
| 2020/0333805 | A1 | 10/2020 | English et al. | |
| 2021/0001979 | A1 * | 1/2021 | Mikic | B64C 27/08 |
| 2022/0017208 | A1 | 1/2022 | Spiegel et al. | |
| 2022/0041267 | A1 * | 2/2022 | De Freitas | B64C 13/0421 |
| 2023/0227146 | A1 | 7/2023 | Richter et al. | |

* cited by examiner

Example cockpit control devices currently found in aviation industry

Flight phases for VTOL vehicle

IAC device movements

Example of an IAC cockpit installation

| | IAC Movement | Direction | Aircraft Response in Taxi Phase |
|---|---|---|---|
| 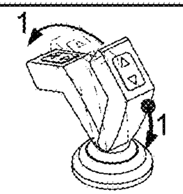  | Pitch Movement | Both | No Aircraft effect |
| 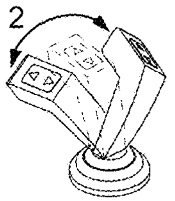  | Roll Movement | Both | Change of heading and reduction of ground speed |
| 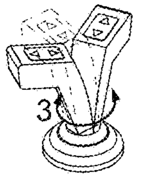  | Yaw Movement | Both | Change of heading |
| 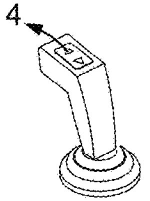  | Scroll Movement | Forward | Increase ground speed |
| 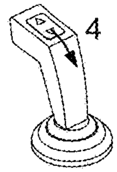  | Scroll Movement | Afterward | Reduce ground speed |
FIG. 5
IAC movements and aircraft response for Taxi phase

| | IAC Movement | Direction | Aircraft Response in Hover Phase | Aircraft Response in Cruise Phase |
|---|---|---|---|---|
| 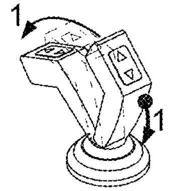 | Pitch Movement | Both | Vertical response | Flight path response |
| 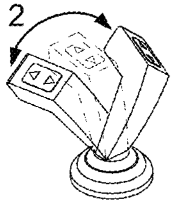 | Roll Movement | Both | Lateral translation response | Coordinate turn response |
| 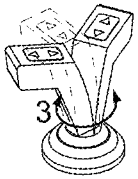 | Yaw Movement | Both | Heading response | Sideslip response |
| 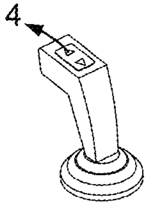 | Scroll Movement | Both | Longitudinal translational response | Speed response |

FIG. 6

| | IAC Movement | Direction | Aircraft Response in Taxi Phase |
|---|---|---|---|
| 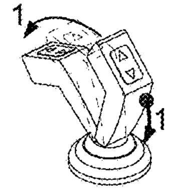  | Pitch Movement | Forward<br>Afterward | Increase ground speed<br>Reduce ground speed |
| 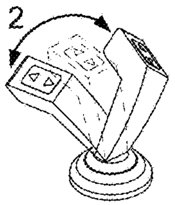  | Roll Movement | Both | Change of heading and reduction of ground speed |
| 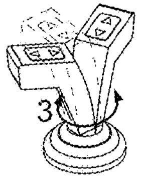  | Yaw Movement | Both | Change of heading |
| 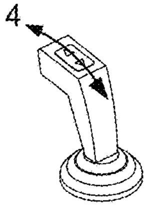  | Scroll Movement | Both | No Aircraft effect |
FIG. 7
IAC second variation movements and aircraft response for Taxi phase

| | IAC Movement | Direction | Aircraft Response in Hover Phase | Aircraft Response in Cruise Phase |
|---|---|---|---|---|
| 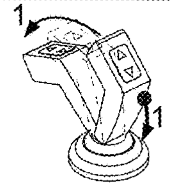  | Pitch Movement | Both | Longitudinal translational response | Speed response |
| 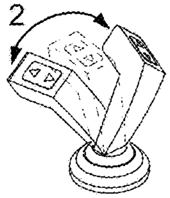  | Roll Movement | Both | Lateral translation response | Coordinate turn response |
| 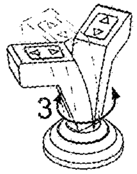  | Yaw Movement | Both | Heading response | Sideslip response |
| 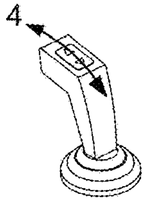  | Scroll Movement | Both | Vertical response | Flight path response |

FIG. 8

IAC second variation movements and aircraft response for Hover and

Example of integration of IAC with the Flight Control System

SYSTEM AND METHOD FOR INTEGRATED AIRCRAFT COMMAND

CROSS-REFERENCE TO RELATED APPLICATIONS

The present application claims the benefit of U.S. Provisional Patent Application No. 63/519,661 filed Aug. 15, 2023, incorporated herein by reference in its entirety and for all purposes.

FIELD

The technology herein relates to the technical field of Aircraft Control Systems, and more particularly to a system and method for integrated aircraft commands in which the pilot can use a single input device capable of controlling all the movement axes of the vehicle.

BACKGROUND

The pilot commands to aircraft Flight and Ground Control Systems is found in different types and forms in the aeronautical industry. These solutions use multiple devices such as central column, pedals, engine's throttle levers, cyclic, collective levers, or sidesticks. Each of these components has different effects on the movements of the aircraft and may require the pilot to coordinate commands simultaneously, i.e.: coupling these devices. FIG. 1 illustrates some of these pilot control devices currently found in the aviation industry. In some instances, each device shown in FIG. 1 may be found on a given aircraft. Often, redundant devices are provided for multiple pilots or other flight crew members.

Such vehicle control components are well known and widely used in aircraft of different categories and types. Having multiple devices for the pilot to control the aircraft, however, results in increasing weight of the cockpit control system, as well as resulting in taking up more physical space to accommodate all the control components. This is typically not a significant problem in the context of a passenger jet or other large aircraft.

However, vehicles under development for Urban Air Mobility (UAM) such as electric vertical takeoff and landing aircraft (eVtols) such as shown in FIG. 10 have, in general, reduced space available in the pilot's cockpit, and have very strict weight limitations such that lighter solutions contribute to the efficiency in the performance of these aircraft. For example, an example eVtol design such as shown in FIG. 10 might use a carbon fiber fuselage for reduced weight, have a total weight of around 1000 to 2000 lbs, and carry a pilot and 4 passengers with baggage. The average pickup truck weighs twice as much as such a eVtol and potentially has larger cargo and passenger spaces. There is, therefore, a need to use new pilot command solutions that better address vehicles for UAM in terms of reduced weight, size and complexity.

Work has been done in the past. See for example JP7275272B2. Further advances and improvements are possible and desirable.

BRIEF DESCRIPTION OF THE DRAWINGS

FIG. 5 shows example IAC movements and aircraft effect for the Taxi phase.

FIG. 6 shows example IAC movements and aircraft responses for the Hover and Cruise phases.

FIG. 7 shows example IAC second variation movements and aircraft responses for the Taxi phase.

FIG. 8 shows example IAC second variation movements and aircraft responses for the Hover and Cruise phases.

DETAILED DESCRIPTION OF NON-LIMITING EMBODIMENTS

Figure 1:
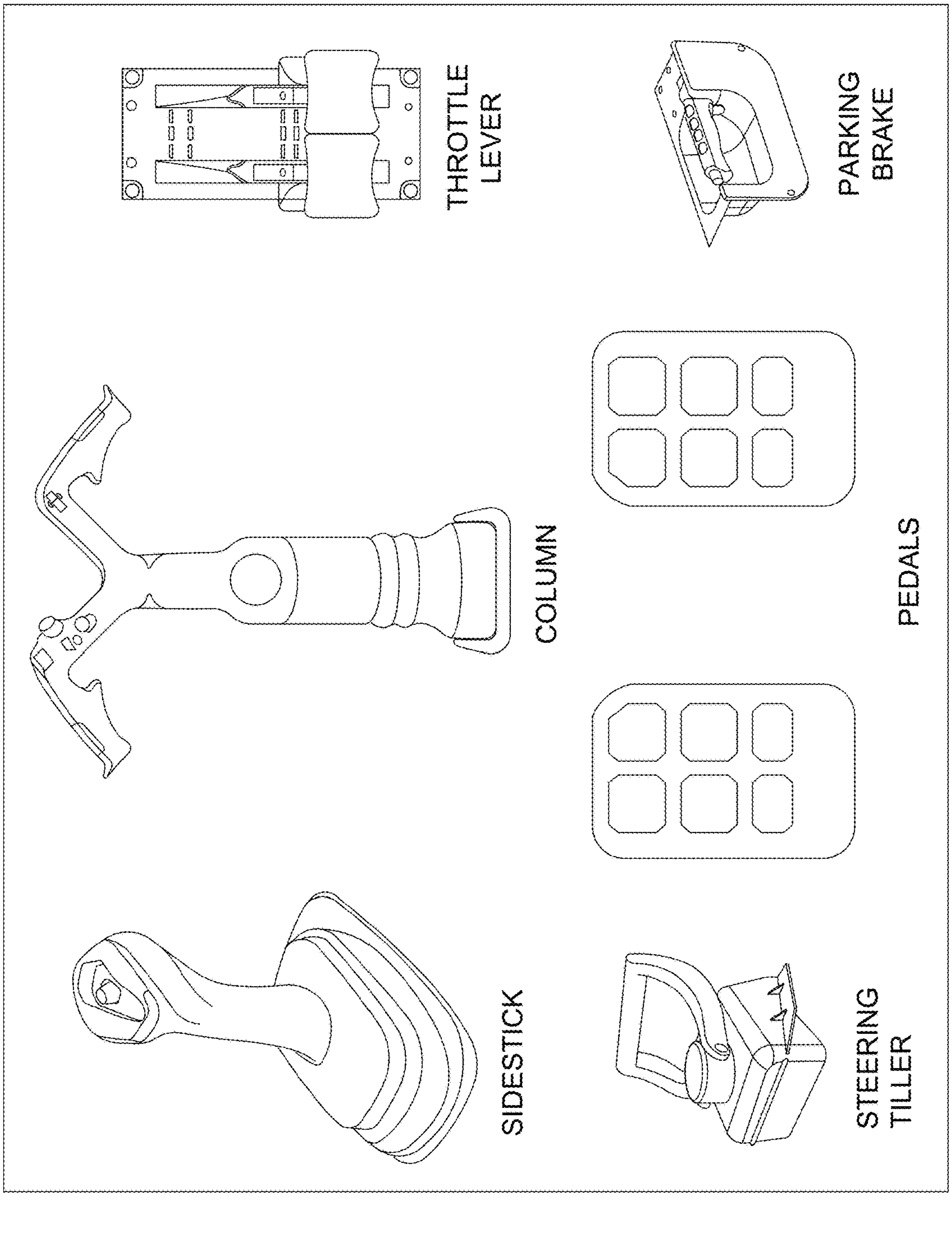
FIG. 1 (PRIOR ART)
FIG. 1 shows example prior art cockpit control devices currently found in the aviation industry.

The technology herein aims to provide a system and method for integrated aircraft command from the pilot using an Integrated Aircraft Command (IAC) with a single inceptor device to control an aerial vehicle such as an eVtol for UAM, for all flight phases of the eVtol.

The Integrated Aircraft Command (IAC) is a system that aims to unify the pilot's controls in a single controller or inceptor device. This makes it possible for the vehicle to be operated in all phases of flight and on the ground using only one component for the pilot's manual control. This results in a cockpit controls solution with less weight and reduced installation footprint compared to traditional systems present in the industry for different categories of aircraft.

In one embodiment, an integrated aircraft control system for a VTOL aircraft having fixed rotors and no tilt rotor comprises a pilot inceptor providing at least four degrees of freedom of movement; at least one processor that transforms the at least four degrees of freedom of movement of the pilot inceptor into corresponding control outputs at least in part in response to flight phase of the VTOL aircraft; and at least one actuator that controls the VTOL aircraft in response to the corresponding control outputs without requiring aircraft configuration changes for changing flight phase of the VTOL.

The pilot inceptor is configured to output signals indicating pitch movement, roll movement, yaw movement and scroll movement.

The at least one processor is configured to transform pitch movement of the pilot inceptor into vertical response in a hover flight phase and into flight path control in a forward flight phase.

Alternatively, the at least one processor is configured to transform pitch movement of the pilot inceptor into longitudinal translation in a hover flight phase and into speed control in a forward flight phase.

In this alternative, the at least one processor is configured to transform pitch movement of the pilot inceptor into increase or decrease in ground speed in an on-ground operation of the VTOL aircraft.

The at least one processor is configured to transform roll movement of the pilot inceptor into lateral translation during a hover flight phase and into coordinate turn in a forward flight phase.

The at least one processor is configured to transform roll movement of the pilot inceptor into change of heading and reduction of ground speed in on-ground operation of the VTOL aircraft.

The at least one processor is configured to transform yaw movement of the pilot inceptor into yaw movement of the VTOL aircraft in a hover flight phase and into sideslip in a forward flight phase.

The at least one processor is configured to transform yaw movement of the pilot inceptor into heading change in on-ground operation of the VTOL aircraft.

The at least one processor is configured to transform scroll movement of the pilot inceptor into longitudinal translation of the VTOL in a hover flight phase and into speed control of the VTOL aircraft in a forward flight phase.

The at least one processor is configured to transform scroll movement of the pilot inceptor into increase or reduced ground speed in on-ground operation of the VTOL aircraft.

Alternatively, the at least one processor is configured to transform scroll movement of the pilot inceptor into vertical response of the VTOL aircraft in a hover flight phase and into flight path control of the VTOL aircraft in a forward flight phase.

A Taxi phase occurs via hovering at low altitudes to allow the VTOL aircraft to be repositioned and the transforms for the Taxi phase are the same as those for a Hover phase.

Alternatively, a taxi is performed by VTOL aircraft movement while in on-ground operation, if the vehicle is equipped with wheels.

Example VTOL Aircraft Flight Phases

Figure 10:
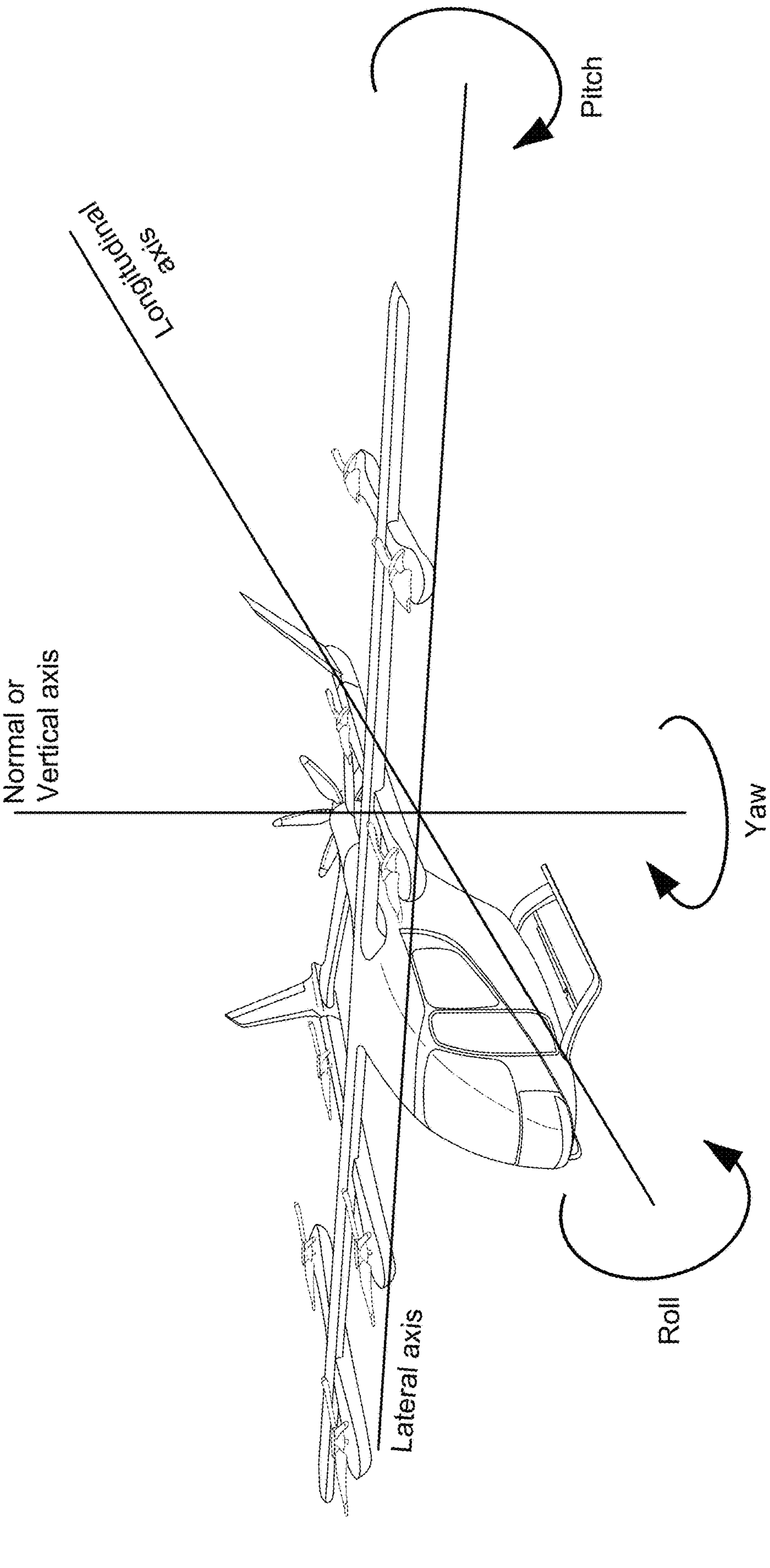
FIG. 10 shows an example eVtol aircraft and showing the VTOL degrees of freedom.

As FIG. 10 shows, the present example technology uses a lift plus cruise design—fixed elements. The aircraft has dedicated rotors for vertical flight, fixed wings and one specific rotor to fly on cruise (in the rear part). All rotors are fixed rotors and there is no tilt rotor. No additional components are required to change rotors positions during flight. Transition between phases does not require any change of aircraft configuration. Other approaches require additional elements (e.g., tilt) to modify the aircraft between hover configuration and forward configuration. Also the first present example embodiment does not require functionality in the pitch-axis—braking motion during ground operation as some other approaches require.

Figure 2:
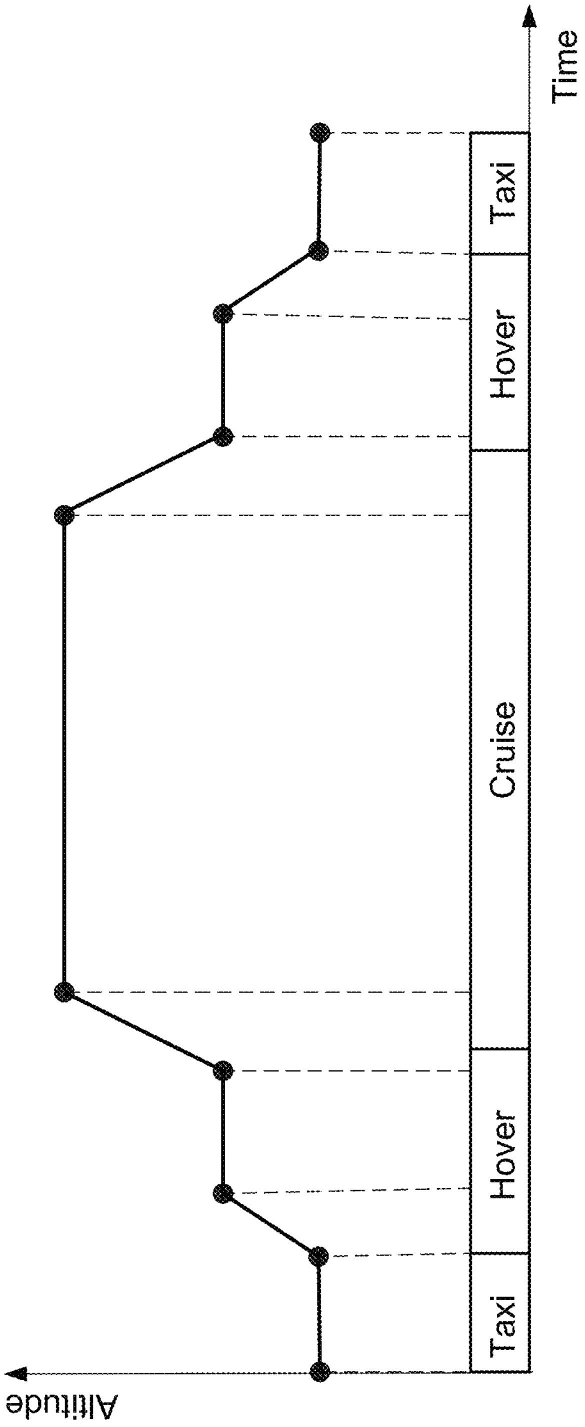
FIG. 2 shows example flight phases for a VTOL vehicle.

The flight phases for a vehicle capable of vertical take-off and landing (VTOL) include taxi-out, take-off, transition, climb, cruise, descent, detransition, landing, taxi-in, any other intermediate phase(s). To simplify in one embodiment, the operating phases of a VTOL vehicle can be grouped into three phases (Taxi, Hover, and Cruise), as shown in FIG. 2. In this diagram, the VTOL taxis to a Final Approach and Takeoff Area (FATO) where it rises (hovers) into the air and then begins moving forward (cruise). Upon landing, the flight modes are reversed (cruise→hover→taxi).

The Taxi phase comprises the movement of the aircraft from a parking area to the Final Approach and Takeoff Area (FATO). In this phase, the vehicle should be controlled to be able to remain stationary, to increase and reduce its ground speed while moving, and to modify its direction (i.e., rotate to point the nose of the aircraft in any desired azimuthal direction). In the taxi phase, the vehicle can rotate left/right ("yaw") and can move forward/backward, or sit still without moving.

In the Hover phase, the vehicle should be controlled to be able to rise into the air and remain static in relation to the ground, and to perform four types of movements: forward and backward translation, sideways translation, rotation, and up and down movements. In other words, the vehicle in the hover phase may be able to move in all three directions of translation (X, Y, Z) and rotate in the yaw direction (in hover, the vehicle changes pitch to move forward/aft, and changes roll to move laterally). Such movement can be described as four (4) degrees of freedom. Moreover, in Hover phase the vehicle is thrust borne, i.e., the aircraft is able to remain on flight due to the propulsion system.

In the Cruise phase, the aircraft should be able to perform movements that allow for changes in altitude, speed, and heading for navigation. In the Cruise phase, the lift may be generated primarily or exclusively by vehicle wings in some embodiments. In the cruise phase, the aircraft can be moved in all six (6) degrees of freedom (pitch up/down, yaw left/right, roll left-right, and translation in each of X, Y and Z).

Example Integrated Aircraft Command (IAC) System

The Integrated Aircraft Command (IAC) system in example embodiments is therefore capable of transducing the pilot's commands to the Flight Control System for all these flight phases. Hence, four movements of the unified device are defined, as shown in FIG. 3:

1—IAC Pitch Movement (pitch of the controller),
2—IAC Roll Movement (roll of the controller),
3—IAC Yaw Movement (yaw of the controller),
4—IAC Scroll Movement (scroll of the controller).

These movements occur around four rotations axes, whose locations can vary to guarantee flexibility in the device's design.

Figure 3:
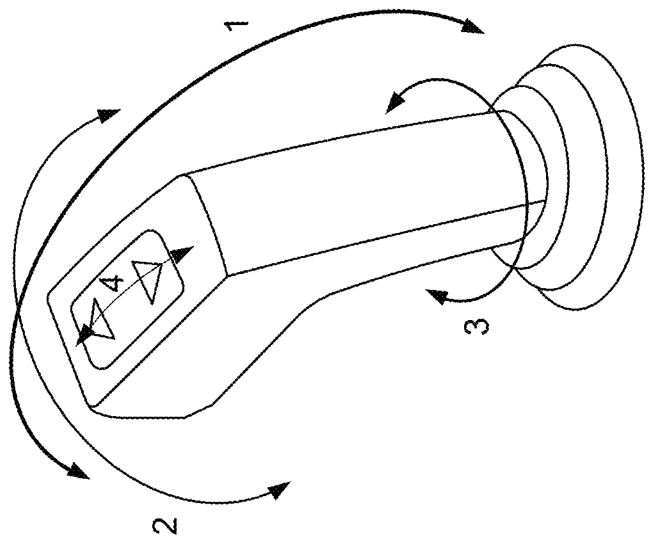
FIG. 3 shows example IAC device movements. All rotation axes can be reagended in different locations to enable project flexibility and better ergonomics for the device.

This means that there is no specific defined shape for the IAC device, in which it can adapt to different projects and ergonomics if it has as inputs to the Flight Control System at least the four movements highlighted in FIG. 3.

For each four axis of rotation of the IAC system (1—IAC Pitch Movement, 2—IAC Roll Movement, 3—IAC Yaw Movement, 4—IAC Scroll Movement), there are Neutral Positions (NP) locations, in which, if deflections occur in relation to these Neutral Positions, restoring forces will arise to return to these neutral positions (NP). Such restoring forces can be supplied for example by biasing devices such as springs, spring-like elements, or spring equivalents.

Figure 4:
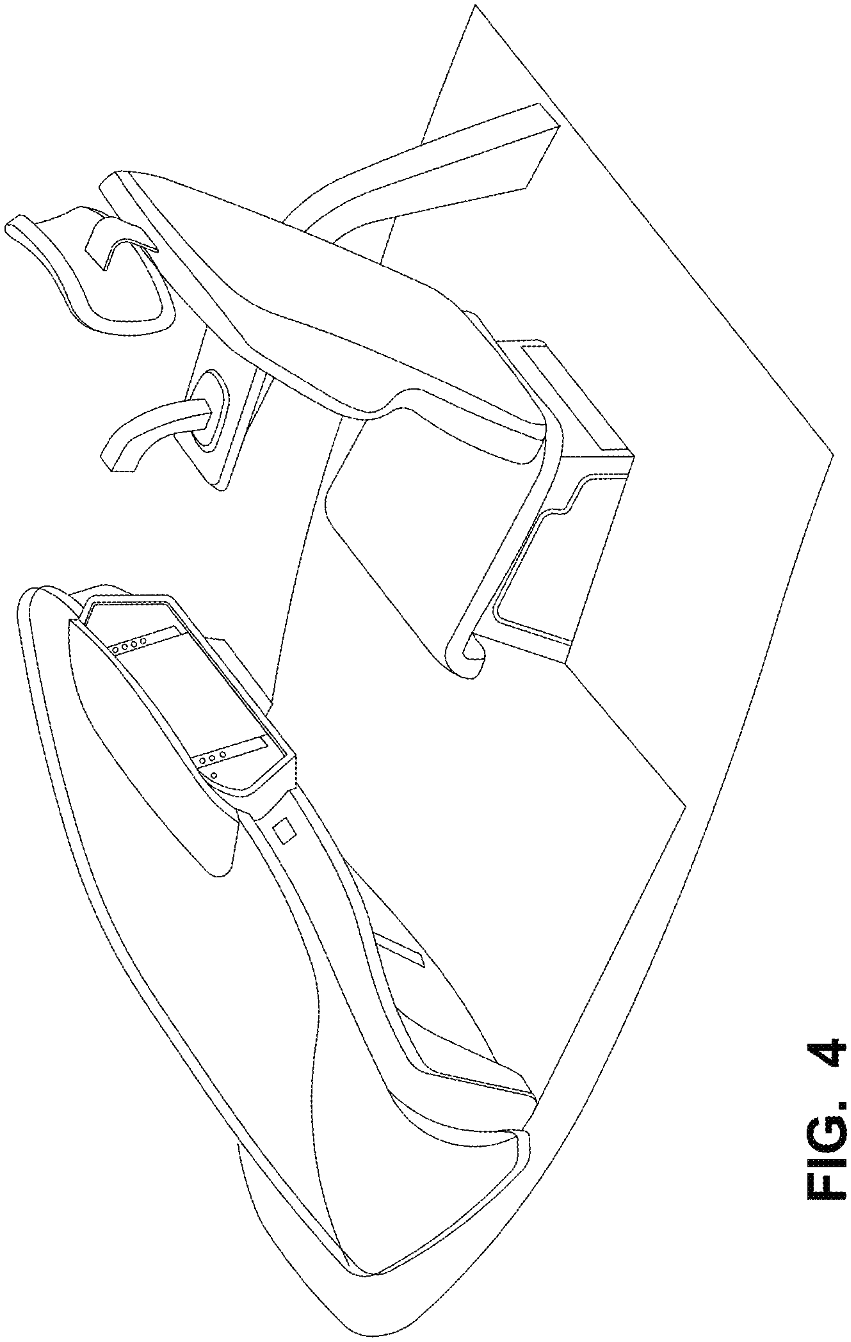
FIG. 4 shows an example installation of an AIC device. This position enables its use through one hand.

The installation position of the IAC device can be in several locations in the cockpit of an aircraft (EVTOL), as long as it allows the pilot to input the commands in a way that results in movements with good ergonomics. In one variation, this device is located to the pilot's side, like a sidestick and operated with just one hand. FIG. 4 shows an example of an IAC device installation on a pedestal or other mounting position in a single-pilot aircraft, leading to reduced installation footprint. In other embodiments, the IAC device could be entirely handheld and moveable in 6DOF.

Example IAC Control of VTOL Aircraft

In example embodiments, the four movements of the Integrated Aircraft Command result in different effects on the aircraft depending on the flight phase. In the first non-limiting embodiments, for the Taxi phase:

- The IAC Pitch Movement (1) does not result in aircraft response (since the aircraft is on the ground, it cannot pitch).

The IAC Roll Movement (2) results in a changing of the vehicle heading and deceleration of the ground speed, for example, by using a differential command to the vehicle brakes (in other words, IAC roll movement is translated into vehicle azimuthal rotation during translational movement, with amount or rate or change of rate of IAC roll movement translated into the rate of change of vehicle azimuthal rotation).

The IAC Yaw Movement (3) results in leading to a vehicle Lateral-Directional effect (changing of heading), for example, by using the Auxiliary Landing Gear rotational movement response. In one example, the vehicle can be stationary (not translating on the tarmac) and this type of movement control can cause the vehicle to rotate about a vertical axis without translation (the yaw rotation of the IAC is applied as yaw rotation of the aircraft).

The IAC Scroll Movement (4) results in the acceleration of the vehicle ground speed when commanded in the positive direction, and its deceleration when commanded in the negative direction, for example, by using the vehicle propellers for acceleration and vehicle brakes for deceleration.

When the IAC Scroll Movement is in Neutral Position, the vehicle does not have a braking application and is free for movements.

These vehicle responses for IAC movements in the Taxi phase are summarized in FIG. 5.

In the first non-limiting embodiments, for the Hover phase as summarized in FIG. 6:

The IAC Pitch Movement (1) results in vehicle altitude responses, generating a climb response if it is moved in the afterward direction, and a descent response if the movement is in the forward direction. In other words, pitch movement of the IAC is translated into ascent/descent of the aircraft.

IAC Roll Movement (2) leads to a lateral translation response, in which the vehicle increases its lateral speed in the same direction moved in the device. In other words, IAC roll movement is translated into aircraft lateral speed proportional to inceptor deflection.

IAC Yaw Movement (3) results in vehicle heading response, therefore, moving the pilot's wrist allows the aircraft's heading to be changed. In this case, IAC yaw movement is applied to cause the aircraft to yaw.

The IAC Scroll Movement (4) results in the longitudinal translational response of the vehicle, in which the movement of the pilot's thumb allows changing the speed of the aircraft's translation.

In the first non-limiting embodiments, in the Cruise phase (as also summarized in FIG. 6):

The IAC Pitch Movement (1) results in the aircraft's longitudinal flight path response.

The IAC Roll Movement (2) has a coordinated turn response from the vehicle. In this embodiment, IAC roll movement is translated into rotation of the aircraft to change the heading of the aircraft.

The IAC Yaw Movement (3) results in vehicle sideslip maneuvering. Note that while yaw is a rotation of the nose of the craft to an angle, side-slip is a motion in the direction of the angle and not in the direction of the nose The IAC Scroll Movement (4) results in the vehicle speed changing.

As noted above, vehicle responses to IAC movements during the Hover and Cruise phases are summarized in FIG. 6.

In a second non-limiting embodiment of the present invention, the effects on the aircraft are different for the Taxing, Hovering and Cruising phases. In this non-limiting embodiment, for the Taxi phase:

The IAC Pitch Movement (1) results in the acceleration of the vehicle ground speed when commanded in the forward direction, and its deceleration when commanded in the afterward direction, for example, by using the vehicle propellers for acceleration and vehicle brakes for deceleration.

The IAC Roll Movement (2) results in a changing of the vehicle heading and deceleration of the ground speed, for example, by using a differential command to the vehicle brakes. (same as in the first embodiment)

The IAC Yaw Movement (3) results in leading to a vehicle Lateral-Directional effect (changing of heading), for example, by using the Auxiliary Landing Gear rotational movement response. (same as in the first embodiment)

The IAC Scroll Movement (4) does not result in aircraft response.

When the IAC Pitch Movement is in Neutral Position, the vehicle does not have a braking application and is free for movements. The vehicle responses for IAC movements in the second non-limiting embodiment at Taxi phase are shown in FIG. 7.

In a second non-limiting embodiment, for the Hover phase:

The IAC Pitch Movement (1) results in the longitudinal translational response of the vehicle, increasing the speed of the aircraft's translation if it is moved in the forward direction, and decreasing its translational speed if it is moved in the afterward direction.

IAC Roll Movement (2) leads to a lateral translation response, in which the vehicle increases its lateral speed in the same direction moved in the device. (same as in the first embodiment)

IAC Yaw Movement (3) results in vehicle heading response, therefore, moving the pilot's wrist allows the aircraft's heading to be changed. (same as in the first embodiment)

The IAC Scroll (4) Movement results in the vehicle altitude responses, generating climb or descent responses.

In a second non-limiting embodiment, in the Cruise phase:

IAC Pitch Movement (1) results in the aircraft's speed changing.

The IAC Roll Movement (2) has a coordinated turn response from the vehicle (same as in the first embodiment).

The IAC Yaw Movement (3) results in vehicle sideslip maneuvering (same as in the first embodiment).

The IAC Scroll Movement (4) results in the longitudinal flight path response.

FIG. 8 summarizes the effects on the aircraft for IAC second variation for the Hover and Cruise phases.

Please see below example comparison between the effect on the aircraft for each individual axis shown in FIG. 10:

| IAC Movement | Phase | First non-limiting embodiment | Second non-limiting embodiment |
|---|---|---|---|
| Pitch Movement | Ground Operation | N/A | Increase or decrease ground speed |
| | Hover | Vertical response | Longitudinal translation |
| | Forward | Flight path | Speed |
| Roll Movement | Ground Operation | Change of heading and reduction of ground speed | Change of heading and reduction of ground speed |
| | Hover | Lateral translation | Lateral translation |
| | Forward | Coordinate turn | Coordinate turn |
| Yaw Movement | Ground Operation | Change of heading | Change of heading |
| | Hover | Heading (yaw) | Heading (yaw) |
| | Forward | Sideslip | Sideslip |
| Scroll Movement | Ground Operation | Increase or reduce ground speed | N/A |
| | Hover | Longitudinal translation | Vertical response |
| | Forward | Speed | Flight Path |

Example Control System Implementation

Figure 9:
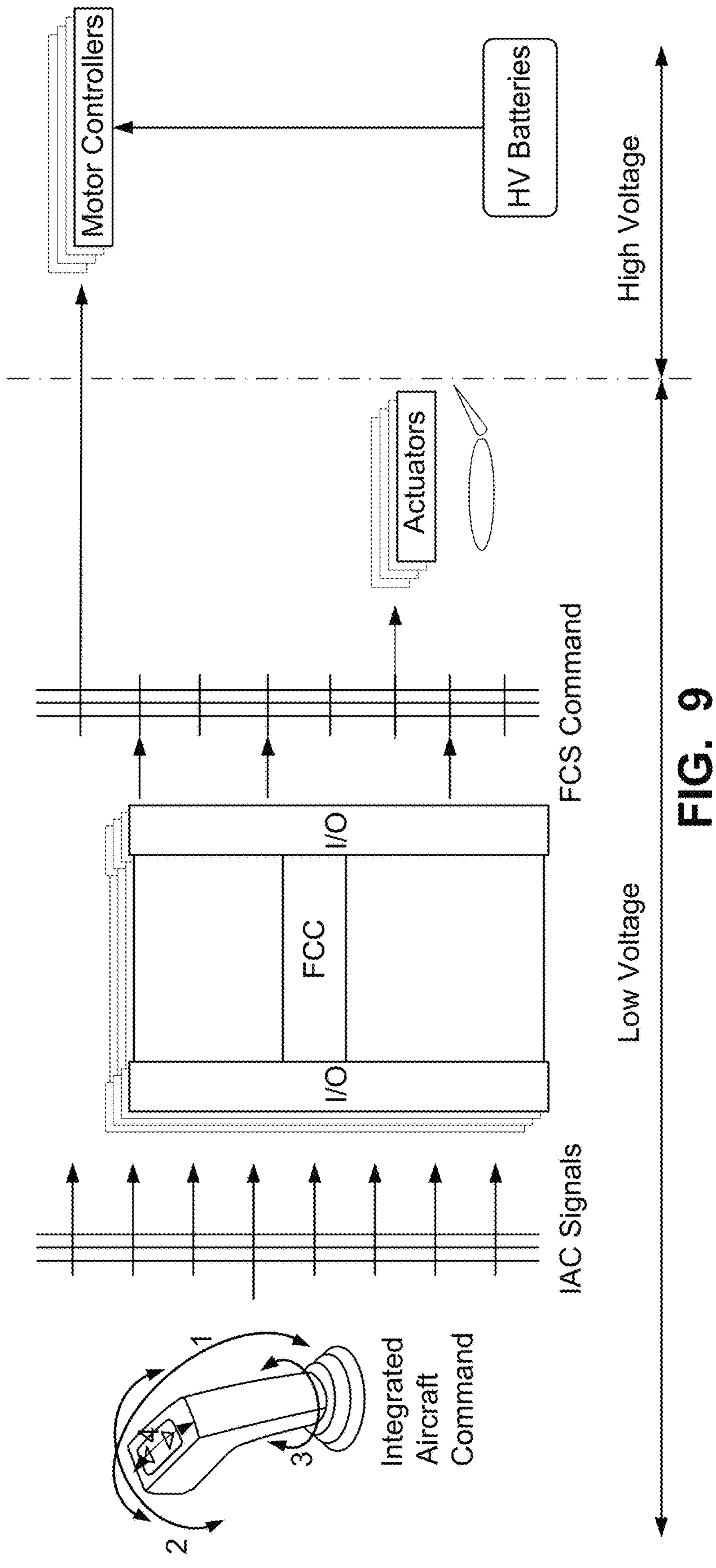
FIG. 9 shows an example of integration of the IAC device with the Flight Control System.

For both non-limiting embodiments, integration of the JAC with the Control System can be done in different ways, using analog and/or digital interfaces. For reasons of redundancy, each of the four movements can have more than one associated sensor and mechanism. The nature of these sensors can also be varied, if they are able to transduce the pilot's demands to the four movements highlighted in the JAC. FIG. 9 exemplifies a possible integration of the JAC with the FCS.

Figure 9A:
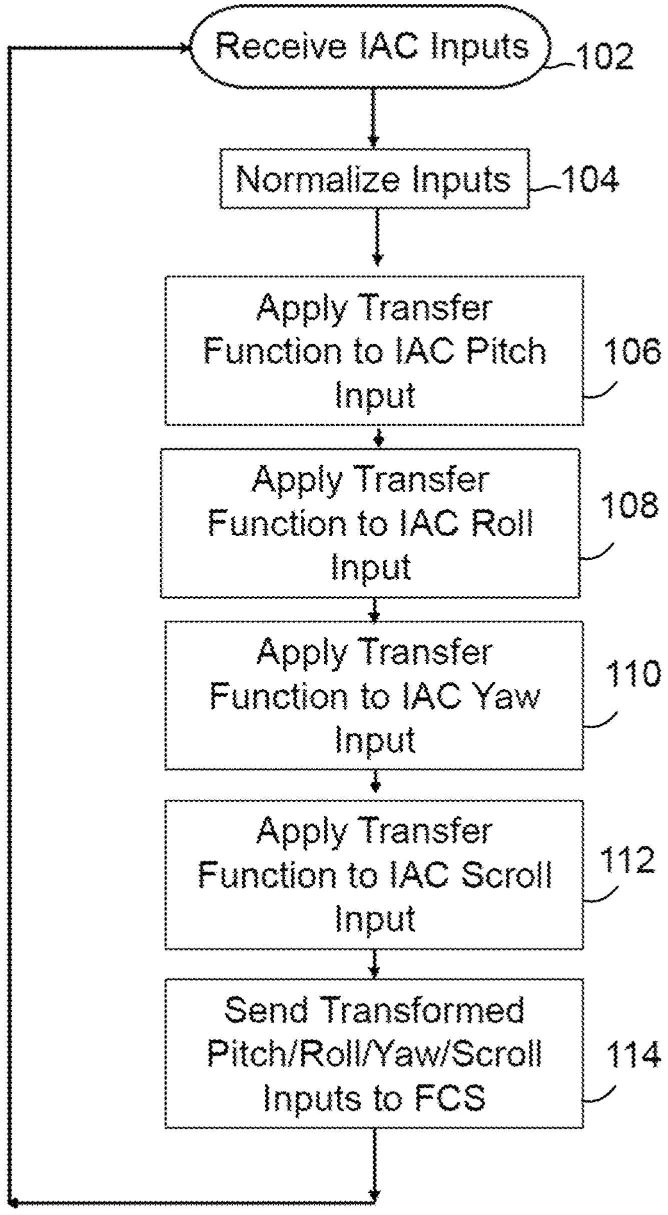
FIG. 9A shows a flowchart of example program control steps.

FIG. 9A shows example program control steps performed by at least one processor coupled to a nontransitory memory storing instructions, which cause the at least one processor to perform the operations shown. In such processing, receive IAC inputs (102) are normalized (104) and analyzed for dead zone to ensure neutral positions generate neutral outputs. The IAC pitch, yaw, roll and scroll inputs are then each transformed to control outputs in accordance with the tables shown in FIGS. 5, 6, 7, 8 and in the table above based on the current flight phase of the aircraft. In this context, "flight phase" includes ground operation (i.e., operation while the VTOL is on the ground) in addition to operation when the VTOL is not on the ground. Such transfer functions or mappings can be implemented by lookup tables, digital signal processing by at least one processor and/or digital circuits, analog signal processing by at least one analog processor and/or analog circuits, or any combination of these. A display in the cockpit (see FIG. 4) can be used to display current flight phase and corresponding functionality of the IAC so the pilot always is informed what IAC movements cause what aircraft movements. The resulting transformed output signals are applied to control laws of the flight control system, which in turn control motors, actuators, etc. to effect the functions shown in FIGS. 5, 6, 7, 8 and in the table above.

In aircraft whose landing gear is via skid, that is, without wheels for locomotion in contact with the ground, the Taxi phase occurs via hovering at low altitudes to allow the vehicle to be repositioned. In this case, for both non-limiting embodiments, the commands for the Taxi phase are the same as those for the Hover phase defined in FIGS. 6 and 8. The commands for the Taxi phase defined in FIGS. 5 and 7 are, therefore, disabled until all elements of the system for movement on the ground are installed and operational.

All patents and publications cited herein are incorporated by reference as if expressly set forth.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. An integrated aircraft control system for a VTOL aircraft having fixed rotors and no tilt rotor, comprising:

a pilot inceptor providing at least four degrees of freedom of movement, the pilot inceptor configured to output signals indicating pitch movement, roll movement, yaw movement and scroll movement;

at least one processor connected to a memory storing instructions, the stored instructions causing the at least one processor to transform the at least four degrees of freedom of movement of the pilot inceptor into corresponding control outputs at least in part in response to flight phase of the VTOL aircraft, wherein the stored instructions causing the at least one processor to perform operations comprising transforming roll movement of the pilot inceptor into lateral translation during a hover flight phase, transforming roll movement into coordinate turn in a forward flight phase, and transform roll movement into change of heading and reduction of ground speed in on-ground operation of the VTOL aircraft; and at least one actuator that controls the VTOL aircraft in response to the control outputs without requiring aircraft configuration changes for changing flight phase of the VTOL aircraft.

2. The integrated aircraft control system of claim 1 wherein the operations further comprise transforming pitch movement of the pilot inceptor into vertical response in a hover flight phase and into flight path control in a forward flight phase.

3. The integrated aircraft control system of claim 1 wherein the operations further comprise transforming pitch movement of the pilot inceptor into longitudinal translation in a hover flight phase and into speed control in a forward flight phase.

4. The integrated aircraft control system of claim 3 wherein the operations further comprise transforming pitch movement of the pilot inceptor into increase or decrease in ground speed in an on-ground operation of the VTOL aircraft.

5. The integrated aircraft control system of claim 1 wherein the operations further comprise transforming roll movement of the pilot inceptor into lateral translation during a hover flight phase and into coordinate turn in a forward flight phase.

6. The integrated aircraft control system of claim 5 wherein the operations further comprise transforming roll movement of the pilot inceptor into change of heading and reduction of ground speed in on-ground operation of the VTOL aircraft.

7. The integrated aircraft control system of claim 1 wherein the operations further comprise transforming yaw movement of the pilot inceptor into yaw movement of the VTOL aircraft in a hover flight phase and into sideslip in a forward flight phase.

8. The integrated aircraft control system of claim 1 wherein the operations further comprise transforming yaw movement of the pilot inceptor into heading change in on-ground operation of the VTOL aircraft.

9. The integrated aircraft control system of claim 1 wherein the operations further comprise transforming scroll movement of the pilot inceptor into longitudinal translation of the VTOL in a hover flight phase and into speed control of the VTOL aircraft in a forward flight phase.

10. The integrated aircraft control system of claim 9 wherein the operations further comprise transforming scroll movement of the pilot inceptor into increase or reduced ground speed in on-ground operation of the VTOL aircraft.

11. The integrated aircraft control system of claim 1 wherein the operations further comprise transforming scroll movement of the pilot inceptor into vertical response of the VTOL aircraft in a hover flight phase and into flight path control of the VTOL aircraft in a forward flight phase.

12. The integrated aircraft control system of claim 1 wherein the VTOL aircraft performs a Taxi phase occurs via hovering at low altitudes to allow the VTOL aircraft to be repositioned, and the operations further comprise transforming pilot inceptor movement for the Taxi phase using the same transforms as those used for a Hover phase.

13. A method of operating a VTOL aircraft having fixed rotors and no tilt rotor, comprising:

receiving signals from a pilot inceptor indicating at least four degrees of freedom of movement of the pilot inceptor, the pilot inceptor configured to output signals indicating pitch movement, roll movement, yaw movement and scroll movement;

transforming, with at least one processor, the pilot inceptor signals into corresponding control outputs at least in part in response to flight phase of the VTOL aircraft, wherein the stored instructions causing the at least one processor to perform operations comprising transforming roll movement of the pilot inceptor into lateral translation during a hover flight phase, transforming roll movement into coordinate turn in a forward flight phase, and transform roll movement into change of heading and reduction of ground speed in on-ground operation of the VTOL aircraft; and controlling at least one VTOL aircraft actuator in response to the corresponding control outputs without requiring aircraft configuration changes for changing flight phase of the VTOL aircraft.

14. The method of claim 13 wherein transforming includes transforming pitch movement of the pilot inceptor into vertical response in a hover flight phase and into flight path control in a forward flight phase.

15. The method of claim 13 wherein transforming includes transforming pitch movement of the pilot inceptor into longitudinal translation in a hover flight phase, into speed control in a forward flight phase and into increase or decrease in ground speed in an on-ground operation of the VTOL aircraft.

16. The method of claim 13 wherein transforming includes transforming yaw movement of the pilot inceptor into yaw movement of the VTOL aircraft in a hover flight phase and into sideslip in a forward flight phase.

17. The method of claim 13 wherein transforming includes transforming scroll movement of the pilot inceptor into longitudinal translation of the VTOL aircraft in a hover flight phase and into speed control of the VTOL aircraft in a forward flight phase.

18. The method of claim 17 wherein transforming includes transforming scroll movement of the pilot inceptor into increase or reduced ground speed in on-ground operation of the VTOL aircraft.

19. The method of claim 13 wherein transforming includes transforming scroll movement of the pilot inceptor into vertical response of the VTOL aircraft in a hover flight phase and into flight path control of the VTOL aircraft in a forward flight phase.

20. The method of claim 13 further wherein the pilot inceptor controlling the VTOL aircraft is the only hand-operated inceptor controlling of the VTOL aircraft.

21. The integrated aircraft control system of claim 1 wherein the pilot inceptor is the only hand-operated inceptor controlling the VTOL aircraft.

* * * * *